Patented Sept. 14, 1954

2,689,247

UNITED STATES PATENT OFFICE 2,689,247

MANUFACTURE OF 1':2'-BENZ-5':6'-PHTHALOYLACRIDONE

Ronald S. Barnes and William Smith, Blackley, Manchester, England, assignors to Imperial Chemical Industries Limited, a corporation of Great Britain No Drawing. Application August 6, 1951, Serial No. 240,614

4 Claims. (Cl. 260—276)

This invention relates to an improved process for the manufacture of a vat dyestuff and more particularly to an improved process for the manufacture of 1':2'-benz-5':6'-phthaloylacridone.

It is well known that the valuable red vat dyestuff, 1':2'-benz-5':6'-phthaloylacridone (Colour Index No. 1162) can be made by condensing beta-naphthylamine with 1-nitro- or 1-chloro-anthraquinone-2-carboxylic acid or derivatives thereof and then ring-closing the beta-naphthyl-1-amino-anthraquinone-2-carboxylic acid to the acridone. It is also well known that the two stages can be carried out in a single operation.

In recent years it has become widely recognised that beta-naphthylamine possesses carcinogenic properties and much care has to be taken to avoid any danger to health arising from the manufacture and use of this compound. However, in spite of all the precautions taken, the manufacture and use of the compound still presented a menace to health and some leading dyestuff manufacturers have accordingly abandoned the manufacture and use of beta-naphthylamine. As a consequence of this it has been necessary for them to abandon the manufacture of the aforementioned valuable red vat dyestuff.

We have now discovered an improved process for the manufacture of the aforementioned valuable red vat dyestuff which avoids the use of beta-naphthylamine and other dangerous carcinogenic compounds.

According to our invention we provide a process for the manufacture of 1':2'-benz-5':6'-phthaloylacridone which comprises heating 2-naphthylamine-1-sulphonic acid with an anthraquinone-2-carboxylic acid containing a labile group in the 1 position or with a functional derivative thereof, in an inert liquid medium.

The 2-naphthylamine-1-sulphonic acid used in the process of our invention is the well known Tobias acid which can be manufactured by sulphonating beta-naphthol and then replacing the hydroxy group by an amino group, so that the manufacture of this intermediate does not present any serious health hazards.

The labile group in the 1-position of the anthraquinone-2-carboxylic acid may be a nitro group or a halogen atom, for example there may be used 1-nitro- or 1-chloro-anthraquinone-2-carboxylic acid.

As examples of inert liquids suitable for use as medium for the reaction there may be mentioned nitrobenzene, o-dichlorobenzene or other organic liquids of suitable high boiling point.

The reaction is preferably carried out in the presence of an acid absorbing agent, for example sodium carbonate, sodium acetate and sodium borate and in the presence of a condensing agent especially one of weakly acid character, such as, for example, boric acid, or arsenic trichloride.

In carrying out the process the reagents are charged into the inert liquid medium and the mixture is slowly heated to about 200–210° C. (when nitrobenzene is used as liquid medium) and maintained at this temperature for about 2 hours. When inert liquids which boil at temperatures lower than 200° C. are used, a longer reaction time is required, when o-dichlorobenzene for example is used, and the reaction is carried out at the boiling point of the liquid, a reaction time of about 6 hours is required.

It appears that the Tobias acid is desulphonated before the condensation with the 1-substituted-anthraquinone-2-carboxylic acid and that the beta-naphthyl-1-amino-anthraquinone-2-carboxylic acid so obtained is then ring-closed to the acridone. As the process can be carried out in a closed vessel, no health hazard arises from the desulphonation of the Tobias acid.

It will be apparent that the beta-naphthyl-1-amino-anthraquinone-2-carboxylic acid may be isolated and if desired subsequently ring-closed to the acridone and this forms a further feature of our invention.

Any beta-naphthylamine remaining at the end of the condensation and/or ring closure step may be destroyed by adding a small amount of, for example, monochloroacetic acid to convert the beta-naphthylamine into a water soluble derivative.

The invention is illustrated but not limited by the following examples in which the parts are by weight.

Example 1

105 parts of Tobias acid (2-naphthylamine-1-sulphonic acid), 162 parts of 1-chloro-anthraquinone-2-carboxylic acid, 285 parts of hydrated borax and 45 parts of boric acid are added to 900 parts of nitrobenzene and the mixture is stirred and heated to about 115° C. when water vapour is evolved. The mixture is stirred at 115° C. until the vigorous evolution of water vapour has subsided (this takes about 1 hour) and the mixture is then heated gradually to 200° C. and maintained at 200–210° C. for 2 hours. 5 parts of monochloroacetic acid are then added and the mixture is stirred for a further 2 hours at 200–210° C. The reaction mixture is cooled and filtered and the filter cake is washed with nitrobenzene, steam-distilled to remove nitrobenzene, again filtered, washed alkali-free and dried.

5 parts of monochloroacetic acid are added to the combined nitrobenzene filtrates and washings and the nitrobenzene is recovered by vacuum distillation.

Example 2

87.5 parts of Tobias acid, 135 parts of 1-chloroanthraquinone-2-carboxylic acid, 53.7 parts of anhydrous sodium carbonate, 6.3 parts of boric acid and 500 parts of nitrobenzene are stirred and heated. Carbon dioxide and water vapour are evolved when the temperature is above 100° C., and the mixture becomes thicker but at about 160° C. the mixture becomes thinner and redder. The mixture is heated to 200° C., stirred at 200–210° C. for 2 hours and then cooled.

The product is isolated as described in Example 1 and obtained in the form of dark red crystals.

Example 3

22.5 parts of Tobias acid are added to 267 parts of o-dichlorobenzene. The mixture is stirred and boiled under a reflux condenser for 2 hours. The mixture is then cooled to below 100° C., and 13.4 parts of 1-nitroanthraquinone-2-carboxylic acid, 18 parts of anhydrous sodium acetate and 2.94 parts of arsenic trichloride are added.

The mixture is stirred and boiled under a reflux condenser for 9 hours and then cooled. The solid is separated by filtration, washed with o-dichlorobenzene, steam distilled to remove o-dichlorobenzene, filtered, washed with water and dried.

What we claim is:

1. Process for the manufacture of 1':2'-benz-5':6'-phthaloylacridone which comprises heating 2-naphthylamine-1-sulfonic acid with an anthraquinone derivative selected from the group consisting of 1-nitro and 1-halogeno anthraquinone-2-carboxylic acids, in an inert liquid medium and at an elevated temperature sufficient to form β-naphthyl-1-amino - anthraquinone-2-carboxylic acid, and ring closing said β-naphthyl-1-amino-anthraquinone-2-carboxylic acid.

2. Process according to claim 1, wherein the heating is carried out in the presence of an acid absorbing agent selected from the group consisting of sodium carbonate, sodium acetate and sodium borate and a condensing agent selected from the group consisting of boric acid and arsenic trichloride.

3. Process for the manufacture of 1':2'-benz-5':6'-phthaloylacridone which comprises heating 2-naphthylamine-1-sulfonic acid with an anthraquinone derivative selected from the group consisting of 1-nitro and 1-halogeno-anthraquinone-2-carboxylic acids, in an inert liquid medium and at elevated temperature whereby β-naphthyl-1-amino-anthraquinone-2-carboxylic acid is formed as an intermediate product, isolating said intermediate product from the reaction mixture and thereafter ring-closing said product to 1':2'-benz-5':6'-phthaloylacridone.

4. Process for the manufacture of β-naphthyl-1-amino-anthraquinone-2-carboxylic acid which comprises heating 2-naphthyl-amine-1-sulfonic acid with an anthraquinone derivative selected from the group consisting of 1-nitro and 1-halogenoanthraquinone-2-carboxylic acids, in an inert liquid medium and at an elevated temperature sufficient to form said β-naphthyl-1-amino-anthraquinone-2-carboxylic acid.

References Cited in the file of this patent

FOREIGN PATENTS

| Number | Country | Date |
| --- | --- | --- |
| 894 | Great Britain | Oct. 26, 1911 |
| 287,614 | Germany | June 11, 1914 |

OTHER REFERENCES

Bonser: Chem. Abstracts, vol. 37, p. 4793, 1943.
Cook et al.: Am. J. Cancer, vol. 29, pp. 219–59, 1937.